US006557490B1

United States Patent
Vaughn

(10) Patent No.: US 6,557,490 B1
(45) Date of Patent: May 6, 2003

(54) FEED DISPENSER

(76) Inventor: Eugene C. Vaughn, P.O. Box 2381, Pahrump, NV (US) 87041

(*) Notice: Subject to any disclaimer, the term of this patent is extended or adjusted under 35 U.S.C. 154(b) by 0 days.

(21) Appl. No.: 10/057,893

(22) Filed: Jan. 29, 2002

(51) Int. Cl.[7] .............................................. A01K 5/01
(52) U.S. Cl. ................... 119/56.1; 119/52.1; 119/51.13
(58) Field of Search .......................... 119/51.11, 51.13, 119/56.1, 57.92

(56) References Cited

U.S. PATENT DOCUMENTS

| | | | | |
|---|---|---|---|---|
| 1,442,382 A | * | 1/1923 | Bullock | 221/3 |
| 2,585,371 A | * | 2/1952 | Coffing | 221/3 |
| 3,683,859 A | * | 8/1972 | Kirk | 221/3 |
| 5,345,893 A | * | 9/1994 | Morris | 119/51.11 |
| 5,520,143 A | * | 5/1996 | Duin | 119/51.13 |
| 5,899,169 A | * | 5/1999 | Jenson | 119/51.13 |
| 6,405,674 B1 | * | 6/2002 | Majewski et al. | 119/52.1 |

* cited by examiner

Primary Examiner—Charles T. Jordan
Assistant Examiner—Susan C. Alimenti
(74) Attorney, Agent, or Firm—Calif Tervo

(57) ABSTRACT

A device 10 for storing and dispensing feed 98 to an animal at predetermined times includes enclosure 12 including a plurality of compartments 16, each including a hingedly attached, downwardly opening bottom door 17 having a storage position for supporting feed and an open position for dispensing feed, a latch assembly 20 associated with each compartment 16 including latch 21 supporting its associated door 17, and latch activation mechanism 40. Each latch 21, in its supported position, may rotate upward for upward re-setting passage of door 17. Latch activation mechanism 40 includes movable ratchet bar 61 including trips 64 for activating latches 21 and rungs 63. Reciprocating assembly 70 includes solenoid 71 for moving ratchet bar 61 and timer 101 for activating solenoid 71 predetermined times. Downstop 90 prevents reverse movement of ratchet bar 61. Up-stop 80 limits the upward movement of ratchet bar rung 63. Right and left compartment latch assembly shafts 22, 32 are co-axial with one inside the other.

18 Claims, 4 Drawing Sheets

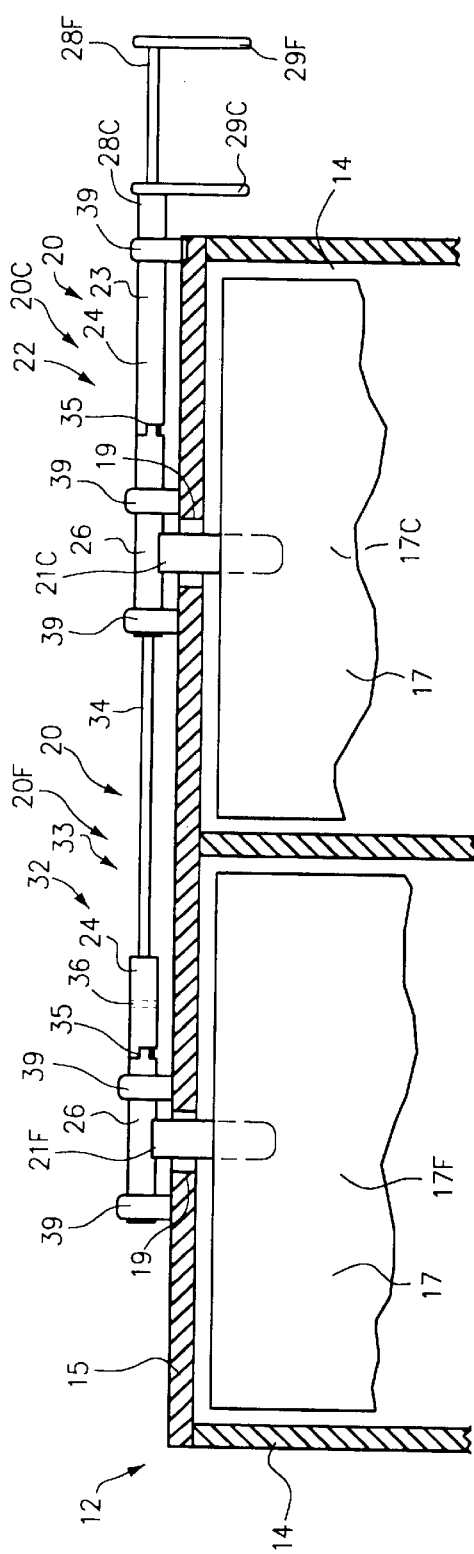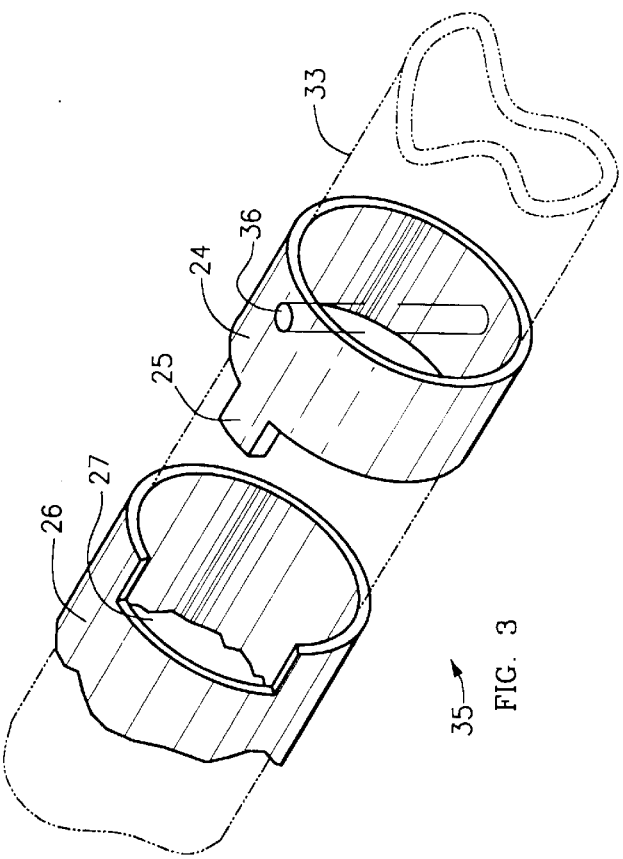

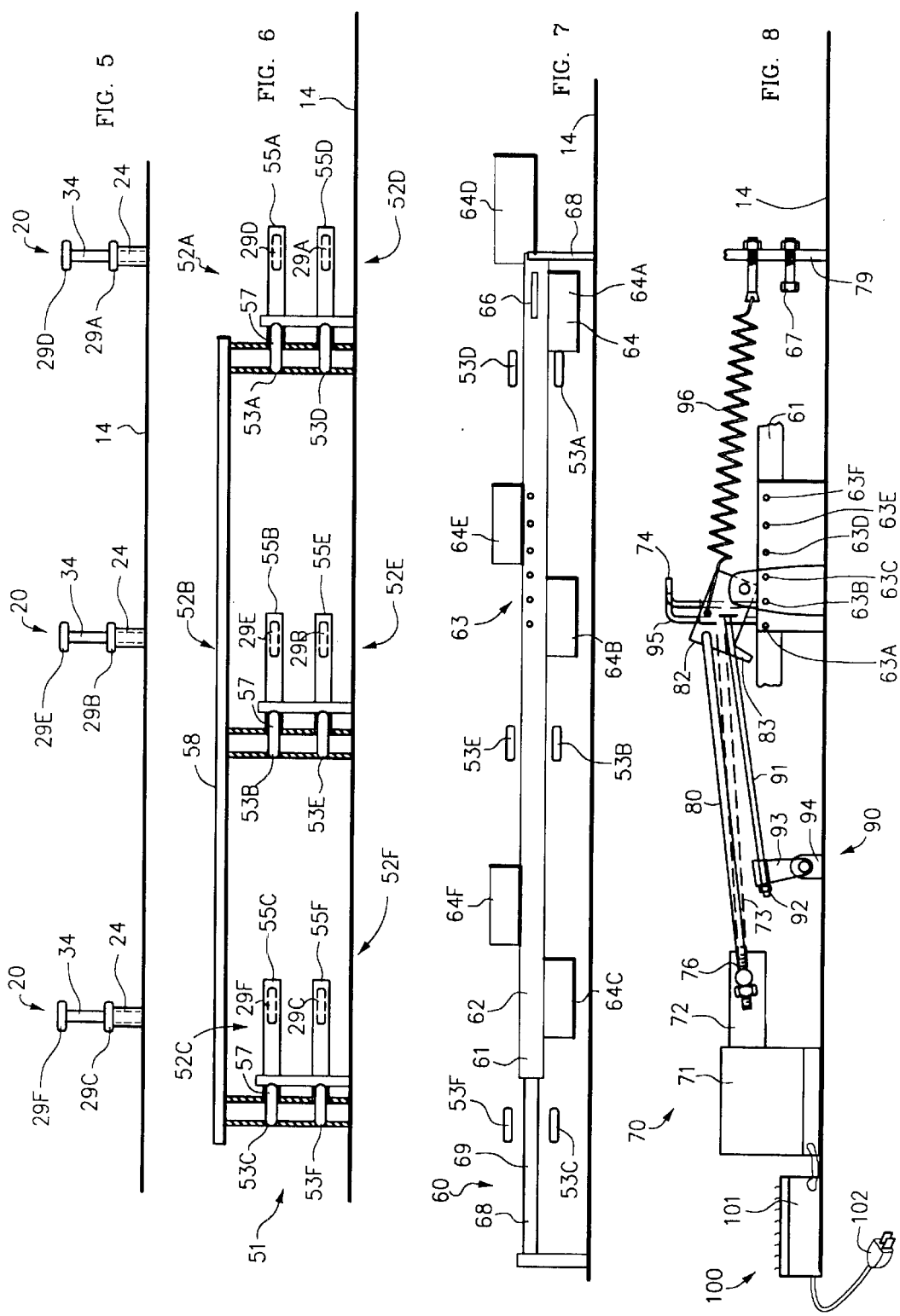

FEED DISPENSER

FIELD OF THE INVENTION

This invention relates in general to a dispenser for storing and dispensing animal feed, such as hay, to an animal at predetermined intervals and more specifically involves using a single linearly reciprocating device, such as a solenoid, to operate an array of feed compartments.

SUMMARY OF THE INVENTION

This invention is a device for storing and dispensing feed to an animal at predetermined times and it generally includes an enclosure including a plurality of compartments, each including a hingedly attached, downwardly opening bottom door having a storage position for supporting feed and an open position for dispensing feed, a latch assembly attached to the enclosure, a latch assembly associated with each compartment, each latch assembly including a latch having a storage position for supporting its associated door in the storage position and a dispensing position for not supporting its door, and a latch activation mechanism for operating the latches. Each latch, in the supported position, may rotate upward for upward passage of its door for resetting the door.

The latch activation mechanism includes a catch assembly associated with each latch assembly, a movable ratchet bar assembly including a ratchet bar including trips for tripping each said catch and rungs, a reciprocating assembly for moving the ratchet bar, and a timer for activating the reciprocating assembly at predetermined times.

The reciprocating assembly including a reciprocating linear activation device, such as a solenoid, including a rod reciprocatingly movable between an extended position and a retracted position, a pull arm connected to the rod and to a pull-pawl for engaging the ratchet bar rungs and moving said ratchet bar when the rod moves from the extended position to the retracted position and for moving to engage another of the ratchet bar rungs when the rod moves to the extended position. A down-stop prevents reverse movement of the ratchet bar. An up-stop limits the movement of the ratchet bar rung upon retraction of the rod.

The device includes an array of compartments including left and right compartments. Right and left latch assembly shafts are co-axial and one inside the other.

Other features and many attendant advantages of the invention will become more apparent upon a reading of the following detailed description together with the drawings wherein like reference numerals refer to like parts throughout.

BRIEF DESCRIPTION OF THE DRAWINGS

FIG. 2 is a partial top plan view of the rear wall portion of the dispenser showing latch assemblies.

FIG. 3 is an enlarged cut-away perspective view of a latch coupling of FIG. 2.

FIG. 5 is a front elevation view taken on line 5—5 of FIG. 4 of the catch arms of the latch assemblies.

FIG. 6 is a front elevation view taken on line 6—6 of FIG. 4 featuring the catch assembly portion.

FIG. 7 is a front elevation view taken on line 7—7 of FIG. 4 featuring the ratchet bar assembly.

FIG. 8 is a front elevation view taken on line 8—8 of FIG. 4 of the timer and reciprocating assembly.

DETAILED DESCRIPTION OF THE INVENTION

Figure 1:
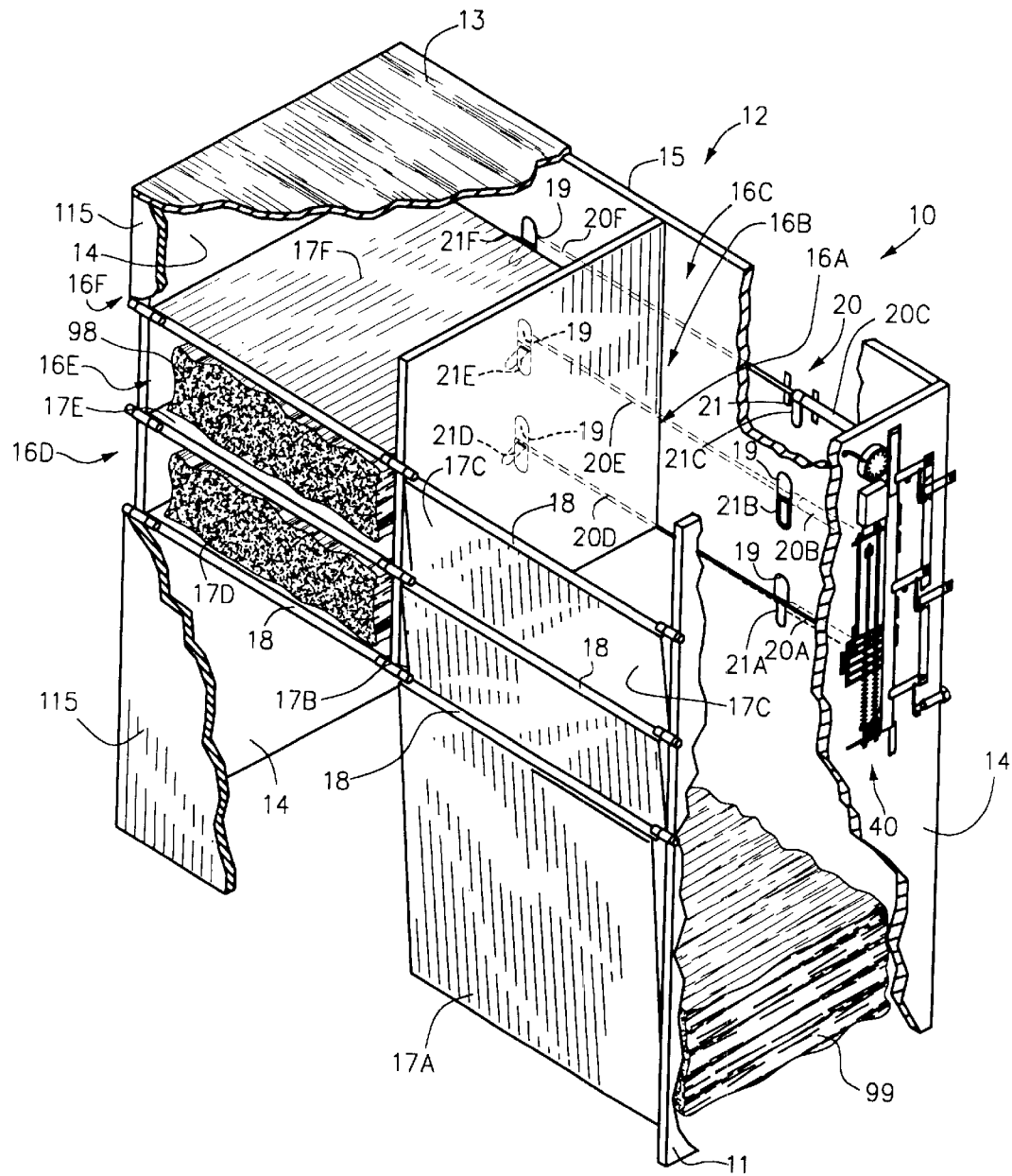
FIG. 1 is a partially-cut-away top three-quarter perspective view of an exemplary embodiment of the feed dispenser of the invention.

With reference now to the drawings, and more particularly to FIG. 1 thereof, there is shown a partially-cut-away top three-quarter perspective view of an exemplary embodiment of the feed dispenser 10 of the invention. Feed dispenser 10 generally comprises legs 11 supporting an enclosure 12 having a roof 13, side walls 14, a rear wall 15, a front wall 115, and a plurality of compartments 16, such as compartments 16A–16F, each including a bottom door 17, such as doors 17A–17F. Although three levels, a lower, middle and upper, of compartments 16 are shown and described, the principles of the invention apply to any number of levels. Front wall 115 includes securable doors (not shown) for access to compartments 16A–16F and, if desired, to beneath lower compartments 16A, 16d.

Enclosure 12 protects the stored feed 98 from the weather and from animals. Enclosure 12 also prevents the animal being fed by feed dispenser 10 from taking feed 98 prematurely. Typically, the bottom of rear wall 15 is level with the bottom of lower compartments 16A, 16D allowing dispensed feed 98 to exit enclosure 12 to a feeding trough. In a preferred embodiment, feed dispenser 10 stands on the ground adjacent a fenced corral containing an animal. A platform is disposed below the lower compartments 16A, 16D for receiving dispensed feed 98, so that the animal may eat feed 98, such as by the animal extending its neck through widely-spaced rails of the corral. In another preferred embodiment, a slide disposed under the lower compartments 16 of enclosure 12 may receive dispensed feed 98 and move feed 98 by gravity outside enclosure 12, through the rails of the corral, and onto the ground inside the corral. In another preferred embodiment, feed dispenser 10 may stand on the ground in a field. Walls do not extend to ground level, leaving openings to allow an animal to eat dispensed feed 98.

Doors 17 have a hinged end 18 hingedly attached to enclosure 12 so as to open downwardly from a storage position supporting feed 98, such as hay 99, to an open position for dispensing feed 98. Doors 17A–17C are shown in the open position. Doors 17D–17F are shown in the storage position. Doors 17, in the open, or dispensing position, hang substantially vertically. Doors 17 are released from bottom to top such that feed 98 of middle and upper compartments 16 falls through the space of the lower compartments 16 during dispensing.

Each compartment 16, is associated with a latch assembly 20, attached to rear wall 15. Each latch assembly 20 includes a latch 21, such as latches 21A–F, protruding through a hole 19 in rear wall 15. Each latch 21 has a storage position for supporting its associated door 17 in the storage position and has a dispensing position for not supporting door 17. Latches 21A–21C are shown in the dispensing position. Latches 21D–21F are shown in the storage position, supporting doors 17D–17F.

A latch activation mechanism 40 operates on latch assembly 20 so as to move latches 21 to the dispensing position at a predetermined time and sequence so as to dispense feed 98.

Turning now to FIGS. 2 and 3, FIG. 2 is a partial top plan view of the rear wall 15 of dispenser 10 showing the upper-most latch assemblies 20, such as right latch assembly 20C for door 17C of upper right compartment 16C and left latch assembly 20F for door 17F of upper left compartment 16F. Middle right and left compartments 16B, 16E and lower right and left compartments 16A, 16D have similar associated latch assemblies 20B, 20E and 20A, 20D respectively (see FIG. 1), such that a latch assembly 20A–20F including a catch arm 29A–29F is associated with each latch 21A–21F. Latch assemblies 20 are mounted in bearings 39 attached to rear wall 15. FIG. 3 is an enlarged cut-away perspective view of a latch coupling 35 of FIG. 2. Right latch assembly 20C includes latch 21C attached, such as by welding, to a right shaft means 22, such as right tubular shaft 23 including a distal end connected to right latch 21C and a proximal end 28C having a catch arm 29, such as catch arm 29C attached, such as by welding, at a right angle thereto. Right catch arm 29C is coupled by shaft 23 to latch 21C such that supporting the distal end of arm 29C supports latch 21C in the storage position.

Left latch assembly 20F includes latch 21F attached, such as by welding, to left shaft means 32, such as left shaft 33 including distal end connected to left latch 21F and a proximal end 28F having an arm 29, such as catch arm 29F attached, such as by welding, at a right angle thereto. Left catch arm 29F is coupled by left shaft 33 to latch 21F such that supporting the distal end of arm 29F supports latch 21F in the storage position. Left shaft 33 includes a midsection 34 partially disposed within right tubular shaft 23 and that is coaxial therewith and freely journaled therein. Midsection 34 is attached, such as by welding or a pin 36, to drive section 24, described below.

Doors 17 are set on latches 21 in the support position by swinging doors 17 upward. Means is provided for each latch 21 in the support position to freely swing upward as its upward swinging door 17 encounters it. After upward passage of its door 17, latch 21 falls back to the support position and door 17 is placed on latch 21 to be supported by latch 21. As best seen in FIGS. 2 and 3, each latch 21C, 21F is connected to latch shaft 23, 33 including a coupling means 35 wherein the shaft includes a drive portion 24 including an engaging means, such as tooth 25, and a driven portion 26 including a slot 27. Tooth 25 bears against the end of slot 27 to hold latch 21 in the support position. Driven portion 26 can be freely rotated the length of slot 27 such that latch 21 rotates upward to allow for passage of door 17 to set door 17 ready to receive feed 98 for storage.

Figure 4:
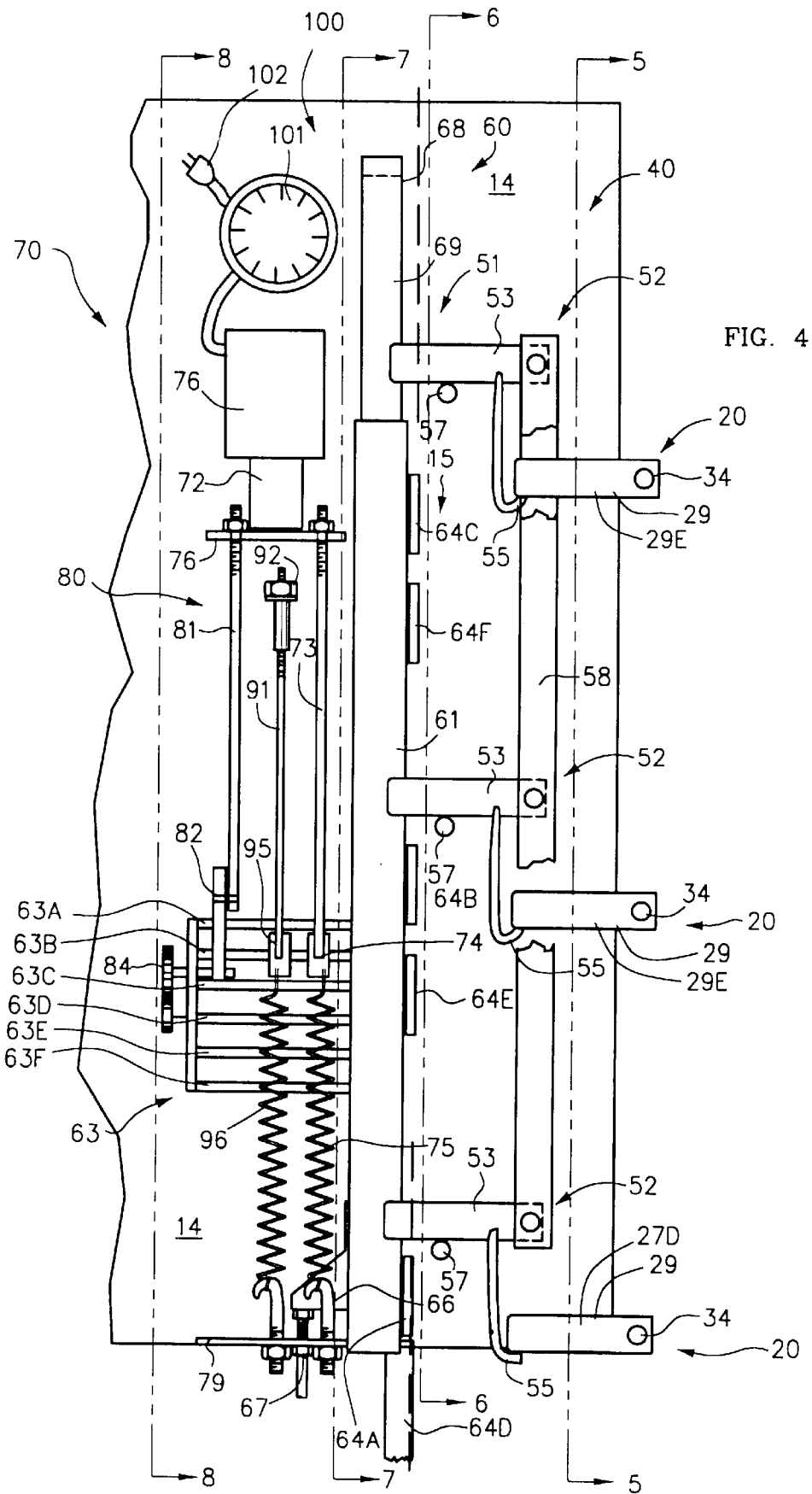
FIG. 4 is an enlarged side elevation view of the latch activation mechanism.

FIG. 4 is an enlarged side elevation view of the latch activation mechanism 40 for selectively periodically operating latches 21 for dispensing portions of feed 98 to an animal. FIG. 5 is a front elevation view taken on line 5—5 of FIG. 4 of catch arms 29 of the latch assemblies 20. In the exemplary embodiment, latch arms 29 for each level are disposed and spaced one above the other, and latch arms 29 for right and left sides are respectively disposed side by side. Activation mechanism 40 generally comprises a catch assembly portion 51, a ratchet bar assembly 60, a reciprocating assembly 70, and means 100, including timer 101, for activating reciprocating assembly 60.

Looking primarily at FIGS. 4 and 6, there is featured catch assembly portion 51. FIG. 6 is a front elevation view taken on line 6—6 of FIG. 4 featuring catch assembly portion 51. Catch assembly portion 51 includes a support structure 58 connected to enclosure side 14 and supporting catch assemblies 52, a catch assembly 52A–52F being associated with each catch arm 29A–29F respectively. Each catch assembly 52 includes a trigger 53, such as triggers 53A–53F, pivotally mounted to support structure 58. Each trigger 53 includes a catch 55, such as catches 55A–55F. Triggers 53A–53F are clockwise pivotable between an engaging position, shown, wherein their respective catches 55A–55F engage their associated catch arms 29A–29F, shown in phantom, to support their associated latches 21A–21F in the storage position and a tripped position not so engaged and not supporting the catch arms 29A–29F such that latches 21A–21F drop to the dispensing position. A plurality of stops 57, connected to side wall 14, retain triggers 53 in a position for setting catch arms 29 on catches 55.

Looking primarily at FIGS. 4 and 7, there is featured a ratchet bar assembly 60 including mounting structure 68 attached to side wall 14 including an elongate slide 69, shown square in lateral cross-section, for linearly slidingly supporting a ratchet bar 61. Ratchet bar 61 includes a tube 62 adapted, such as by being square, for sliding on slide 69.

A plurality of trip means, such as trips 64, with a trip 64A–64F associated with each trigger 53A–53F, are attached to ratchet bar 61 for tripping each associated trigger 53A–53F to the tripped position upon successive movements of ratchet bar 61. Trips 64 are plates attached to ratchet bar 61. As best seen in FIG. 7, as shown, trips 64 are spaced such that sliding movement of ratchet bar 61 trips triggers 53A–53D successively. Alternatively, trips 64 could be attached to ratchet bar 61 so as to trip triggers 53 in another desirable order, such as A, D, B, E, C, F, or to simultaneously trip triggers, such as A and D, B and E, and C and F. Means, such as stop member 66 and stop 67, are provided for adjusting the initial set position of ratchet bar 61. Stop member 66, attached to ratchet bar 61, encounters stop 67, which limits further downward movement of ratchet bar 61. Stop 67, as shown, is a screw threadably attached to a mounting plate 79 attached to side wall 14. Screwing stop 67 up or down adjusts the initial position of ratchet bar 61.

As best seen in FIG. 4, a ratchet bar 61 includes a plurality of spaced engaging means, such as rungs 63, attached thereto and movable therewith, a rung 63A–63F being associated with each latch 21A–21F. Alternatively, not shown but as discussed above, a rung could be associated with more than one latch 21. Rungs 63 are spaced in accordance with the spacing of trips 64 as will be more fully understood below.

Looking primarily at FIGS. 4 and 8, there is featured a reciprocating assembly 70 for moving ratchet bar 61 and means 100 for activating reciprocating assembly 70. FIG. 8 is a front elevation view taken on line 8—8 of FIG. 4. Reciprocating device 70 includes a reciprocating device, such as solenoid 71. Other reciprocating devices include pneumatic or hydraulic rams. Solenoid 71 includes a rod 72 reciprocatingly movable between an extended position, shown, and a retracted position when solenoid 71 is activated.

A pull arm 73 includes a first end pivotally connected to rod 72, such as to a lateral bolt 76 through rod 72, so as to be movable therewith and a second end including a pull-pawl 74 for engaging a rung 63 and thereby moving ratchet bar 61 when rod 72 moves from the extended position to the retracted position and for moving to engage another rung when rod 72 moves to the extended position. Pull-pawl 74 has a first side adapted for engaging a rung 63 and an opposite side adapted, such as by having an incline, for riding over a rung 63 upon movement to the extended position. Means, such as spring 75, biases pull-pawl 74 to remain in contact with rungs 63. Each time solenoid 71 is activated, pull-pawl 74 pulls a rung 63 upward and then extends to engage the next rung 63. Means is provided for adjusting the length of pull arm 73 such as connecting it to rod 72 with a threaded nut adjustment as shown.

An up-stop assembly 80 limits the movement of a rung 63 upon retraction of rod 72. Up-stop assembly 80 includes an up-stop arm 81 including a first end pivotally attached to rod 72, such as to lateral bolt 76, so as to be movable therewith and a second end pivotally attached to an up-stop 82 pivotally mounted on mount 84 attached to side wall 14. Up-stop 82 includes means, such as a tooth 83, for engaging rungs 63. Upon retraction of rod 72, arm 81 causes up-stop 82 to pivot downward such that tooth 83 blocks further movement of the rung 63 pulled by pull-pawl 74. Means is provided for adjusting the length of up-stop arm 81, such as being attached by a threaded nut to bolt 76. Up-stop assembly 80 checks the momentum of ratchet bar 61 so that it does not move further than desired. Up-stop assembly 80 also controls the maximum retraction of rod 72, such that even if rod 72 would retract further, it is prevented by assembly 80. This feature permits the use and substitution of solenoids 71 having different throws.

A down-stop assembly 90 prevents reverse movement of ratchet bar 61. Down-stop assembly 90 includes a down-stop arm 91 having a first end attached such as by wing nut 92 to a swing arm 93 pivotally attached to mount 94 mounted on side wall 14 and having a second end including a down-stop pawl 95. Down-stop pawl 95 has a first side adapted for engaging a rung 63 and an opposite side adapted, such as by having an incline, for riding over a rung 63 as rod 72 is retracted. Means, such as spring 96, biases down-stop pawl 95 to remain in contact with rungs 63. Each time solenoid 71 is activated, pull-pawl 74 pulls a rung 63 upward and down-stop pawl 95 rides over the next rung 63 to engage its back side to prevent backward movement. Means is provided for adjusting the length of down-stop arm 91, such as connecting it to swing arm 93 with a threaded nut 92 adjustment as shown.

Activation means 100, such as timer 101, is connected to solenoid 71 for activating solenoid 71. Timer 71 may be of any conventional type that is programmable or settable to activate solenoid 71 at predetermined times, such as to feed the animal portions of feed 98 at set hours of the day. Of course, solenoid 71 could be activated by any switch, either manually operated or automatic. Timer 101 and solenoid 71 may be connected, such as by plug 102, to any desirable power source, such as a power line or battery. The device uses very little power because solenoid 71 requires only a short burst of energy periodically for each door drop. Such periodic power use is ideal for a battery and a battery will last a long time. Since use is usually out of doors and often at remote locations, a small solar charger with the battery will provide years of power for the device.

In use, activation mechanism 40 is set to the start position as shown. Ratchet bar 61 is all the way down and resting on stop 67. Triggers 53 rest on stops 57 and catches 55 hold catch arms 29. Doors 17 are supported by latches 21. Feed 98 is loaded into compartments 16 as desired.

At a predetermined feeding time or interval, solenoid 71 is activated by timer 101 such that rod 72 retracts, pull-pawl 74 pulls rung 63A upward, up-stop 82 pivots down to limit upward movement of rung 63A, and down-stop pawl 95 slides behind rung 63B to prevent retreat. Ratchet bar 61 moves upward and trip 64A trips trigger 53A moving catch 55A to release catch arm 29A thus dropping latch 21A to the dispensing position whereby door 17A drops downward dispensing feed 98 from compartment 16A.

As solenoid 71 extends rod 72, up-stop 82 pivots up and pull-pawl 74 drops behind rung 63B. The process is then repeated with rung 63B and each successive rung 63 being pulled up.

To reset dispenser 10 to the start position, pull-pawl 74 and down-stop pawl 95 are manually disengaged from rungs 63, such as by pulling outward on them 74, 95. Whereupon, ratchet bar 61 slides downward by gravity to the start position. Catch arms 29 are re-set in catches 55. Doors 17 are manually swung upward, starting with the highest fallen door 17 on the left or right side of enclosure 12. Each door 17 is swung past start position so as to swing past latch 21 and then released so as to be caught by its latch 21. Fresh portions of feed 98 are placed on each door 17, such as by access doors (not shown) in front wall 115.

Although a particular embodiment of the invention has been illustrated and described, various changes may be made in the form, composition, construction, and arrangement of the parts herein without sacrificing any of its advantages. Therefore, it is to be understood that all matter herein is to be interpreted as illustrative and not in any limiting sense, and it is intended to cover in the appended claims such modifications as come within the true spirit and scope of the invention.

In the appended claims, "rung" means any device such as a tooth, depression, or surface feature for engaging a pawl. Also, the terms "left" and "right" are relative.

I claim:

1. A device for storing and dispensing feed to an animal; said device comprising:
    an enclosure including:
        a plurality of compartments; each including:
            a hingedly attached, downwardly opening bottom door having a storage position for supporting feed and an open position for dispensing feed;
    a latch assembly attached to said enclosure; a latch assembly associated with each compartment; each said latch assembly including:
        a latch having a storage position for supporting said door of said latch's associated compartment in the storage position and having a dispensing position for not supporting said door of said latch's associated compartment; and
    a latch activation mechanism comprising:
        a catch assembly associated with each latch assembly; each including:
            a catch movable between an engaging position engaging its associated latch assembly so as to support its associated latch in the storage position and a tripped position not supporting said latch;
        a ratchet bar assembly including:
            a movable ratchet bar including:
                a plurality of spaced engaging means; and
            trip means attached to said ratchet bar for tripping each said catch to the tripped position upon separate movements of said ratchet bar; and
        a reciprocating assembly including:
            a rod reciprocatingly movable between an extended position and a retracted position when said device is activated;
            a pull arm including:
                a first end connected to said rod; and
                a second end including:
                    a pull-pawl for engaging one of said ratchet bar engaging means and moving said ratchet bar when said rod moves from the extended position to the retracted position and for moving to engage another of said ratchet bar engaging means when said rod moves to the extended position.

2. The device of claim 1 further including:
   timer means for activating said reciprocating assembly at predetermined times.

3. The device of claim 1 further including:
   down-stop means for preventing reverse movement of said ratchet bar.

4. The device of claim 1 further including:
   up-stop means for limiting the movement of said ratchet bar engaging means upon retraction of said rod.

5. The device of claim 4 wherein:
   said up-stop means includes:
      an up-stop mount attached to said enclosure;
      an up-stop pivotally attached to said up-stop mount; said up-stop including:
         engaging means for engaging said ratchet bar engaging means; and an up-stop arm including:
            a first end pivotally attached to said rod so as to be movable therewith; and
            a second end pivotally attached to said up-stop such that, upon retraction
   of said rod, said up-stop arm pivots said up-stop such that said up-stop engaging means engages said ratchet bar engaging means and blocks further movement thereof.

6. The device of claim 1 wherein:
   each said latch assembly further includes:
      latch coupling means for providing support for said latch in the support position while allowing said latch to be rotated upward passage of said door.

7. A device for storing and dispensing feed to an animal; said device comprising:
   an enclosure including:
      a lower compartment including:
         a hingedly attached, downwardly opening bottom door having a storage position for supporting feed and an open position for dispensing feed; and
      an upper compartment above said lower compartment; said upper compartment including:
         a hingedly attached, downwardly opening bottom door having a storage position for supporting feed and an open position for dispensing feed;
   a lower latch assembly including:
      a lower latch having a storage position for supporting said door of said lower compartment in the storage position and a dispensing position for not supporting said door of said lower compartment;
   an upper latch assembly including:
      an upper latch having a storage position for supporting said door of said upper compartment in the storage position and a dispensing position for not supporting said door; and
   a latch activation mechanism comprising:
      a lower catch assembly including:
         a lower catch movable between an engaging position engaging said lower latch assembly so as to support said lower latch in the storage position and a tripped position not supporting said latch;
      an upper catch assembly including:
         an upper catch movable between an engaging position engaging said upper latch assembly so as to support said upper latch in the storage position and a tripped position not supporting said latch;
      a ratchet bar assembly including:
         a movable ratchet bar including:
            a plurality of spaced engaging means; and
         trip means attached to said ratchet bar for tripping said lower catch to the tripped position upon a first movement of said ratchet bar and for tripping said upper catch to the tripped position upon later movement of said ratchet bar; and
      a reciprocating assembly including:
         a rod reciprocatingly movable between an extended position and a retracted position when said device is activated;
         a pull arm including:
            a first end connected to said rod; and
            an upper end including:
               a pull-pawl for engaging one of said ratchet bar engaging means and moving said ratchet bar when said rod moves form the extended position to the retracted position and for moving to engage another of said ratchet bar engaging means when said rod moves to the extended position.

8. The device of claim 7 further including:
   timer means for activating said reciprocating assembly at predetermined times.

9. The device of claim 7 further including:
   down-stop means for limiting the movement of said ratchet bar engaging means upon retraction of said rod.

10. The device of claim 7 further including:
    up-stop means for limiting the movement of said ratchet bar engaging means upon retraction of said rod.

11. The device of claim 10 wherein:
    said up-stop means includes:
       an up-stop mount attached to said enclosure;
       an up-stop pivotally attached to said up-stop mount; said up-stop including:
          engaging means for engaging said ratchet bar engaging means; and an up-stop arm including:
             a first end pivotally attached to said rod so as to be movable therewith; and
             a second end pivotally attached to said up-stop such that, upon retraction of said rod, said up-stop arm pivots said up-stop such that said up-stop engaging means engages said ratchet bar engaging means and blocks further movement thereof.

12. The device of claim 7 wherein:
    each said latch assembly further includes:
       latch coupling means for providing support for said latch in the support position while allowing said latch to be rotated upward for upward passage of said door.

13. A device for storing and dispensing feed to an animal; said device comprising:
    an enclosure including:
       a right compartment including:
          a hingedly attached, downwardly opening bottom door having a storage position for supporting feed and an open position for dispensing feed; and
       a left compartment horizontally disposed from said right compartment; said left compartment including:
          a hingedly attached, downwardly opening bottom door having a storage position for supporting feed and an open position for dispensing feed;
    a right latch assembly including:
       a right latch having a storage position for supporting said door of said right compartment in the storage position and a dispensing position for not supporting said door;

right tubular shaft means including:
  a right distal end connected to said right latch; and
  a right proximal end; said right tubular shaft means axially rotatable between a storage position supporting said right latch in the storage position and a dispensing position not supporting said right latch;
a left latch assembly including:
  a left latch having a storage position for supporting said door of said left compartment in the storage position and a dispensing position for not supporting said door;
  left shaft means including:
    a left distal end connected to said left latch;
    a midsection disposed with said right tubular shaft; and
    a left proximal end; said left shaft means axially rotatable between a storage position supporting said left latch in the storage position and a dispensing position not supporting said second latch; and
a latch activation mechanism comprising:
  a right catch assembly including:
    a right catch movable between an engaging position engaging said right proximal end so as to support said right proximal end in the storage position and a tripped position not supporting said right proximal end;
  a left catch assembly including:
    a left catch movable between an engaging position engaging said left proximal end so as to support said left proximal end in the storage position and a tripped position not supporting said left proximal end;
  a reciprocating assembly including:
    a rod reciprocatingly movable between an extended position and a retracted position when said device is activated;
    a pull arm including:
      a first end connected to said shaft; and
      a second end including:
        a pull-pawl for engaging one of said ratchet bar engaging means and moving said ratchet bar when said rod moves from the extended position to the retracted position and for moving to engage another of said ratchet bar engaging means when said rod moves to the extended position.

14. The device of claim 13 further including:
timer means for activating said reciprocating assembly at predetermined times.

15. The device of claim 13 further including:
down-stop means for preventing reverse movement of said ratchet bar.

16. The device of claim 13 further including:
up-stop means for limiting the movement of said ratchet bar engaging means upon retraction of said rod.

17. The device of claim 16 wherein:
said up-stop means includes:
  an up-stop mount attached to said enclosure;
  an up-stop pivotally attached to said up-stop mount; said up-stop including:
    engaging means for engaging said ratchet bar engaging means; and an up-stop arm including:
      a first end pivotally attached to said rod so as to be movable therewith; and
      a second end pivotally attached to said up-stop such that, upon retraction of said rod, said up-stop arm pivots said up-stop such that said up-stop engaging means engages said ratchet bar engaging means and blocks further movement thereof.

18. The device of claim 13 wherein:
each said latch assembly further includes:
  latch coupling means for providing support of said latch in the support position while allowing said latch to be rotated upward for upward passage, of said door.

* * * * *